United States Patent
Bai et al.

(10) Patent No.: US 11,537,138 B2
(45) Date of Patent: Dec. 27, 2022

(54) ADAPTIVE REGION DIVISION METHOD AND SYSTEM

(71) Applicant: SHANGHAI SLAMTEC CO., LTD., Shanghai (CN)

(72) Inventors: Jing Bai, Shanghai (CN); Yuxiang Li, Shanghai (CN)

(73) Assignee: SHANGHAI SLAMTEC CO., LTD., Shanghai (CN)

( * ) Notice: Subject to any disclaimer, the term of this patent is extended or adjusted under 35 U.S.C. 154(b) by 265 days.

(21) Appl. No.: 16/650,387

(22) PCT Filed: Sep. 20, 2018

(86) PCT No.: PCT/CN2018/106807
§ 371 (c)(1),
(2) Date: Mar. 25, 2020

(87) PCT Pub. No.: WO2019/062649
PCT Pub. Date: Apr. 4, 2019

(65) Prior Publication Data
US 2020/0225679 A1 Jul. 16, 2020

(30) Foreign Application Priority Data
Sep. 26, 2017 (CN) .......................... 201710883732.3

(51) Int. Cl.
*G05D 1/02* (2020.01)
*G01S 17/89* (2020.01)

(52) U.S. Cl.
CPC ............ *G05D 1/0236* (2013.01); *G01S 17/89* (2013.01); *G05D 1/0253* (2013.01);
(Continued)

(58) Field of Classification Search
CPC .. G05D 1/0236; G05D 1/0253; G05D 1/0257; G05D 1/0274; G05D 2201/0207; G01S 17/89
See application file for complete search history.

(56) References Cited

U.S. PATENT DOCUMENTS

2009/0182464 A1* 7/2009 Myeong ............... G05D 1/0274
701/25
2010/0232639 A1* 9/2010 Ibrahim .................... G06T 7/70
382/281
(Continued)

OTHER PUBLICATIONS

Vasyl Molebny et al,"Laser radar: historical prospective—from the East to the West", Optical Engineering, 56(3), 031220.

*Primary Examiner* — Nicholas Kiswanto
*Assistant Examiner* — Jamal A Shah
(74) *Attorney, Agent, or Firm* — Bayramoglu Law Offices LLC

(57) ABSTRACT

An adaptive region division method and system are provided. The adaptive region division method includes: building an environmental map based on laser radar data and odometer data, to determine information about an environment in which a target device is located (S11); performing feature extraction according to the laser radar data, to determine feature data, where the feature data includes line feature data and point feature data (S12); generating a virtual door according to the feature data and the information about the environment in which the target device is located (S13); and dividing a to-be-divided region where the target device is located according to the virtual door (S14). Therefore, a virtual door is generated according to laser data of a current environment to achieve the purpose of adaptive region division, so that the target device can more efficiently and quickly cover the whole space.

14 Claims, 1 Drawing Sheet

(52) U.S. Cl.
CPC ......... *G05D 1/0257* (2013.01); *G05D 1/0274* (2013.01); *G05D 2201/0207* (2013.01)

(56) References Cited

U.S. PATENT DOCUMENTS

| | | | |
|---|---|---|---|
| 2017/0370710 A1* | 12/2017 | Chen | G01S 15/89 |
| 2018/0165931 A1* | 6/2018 | Zhang | B25J 9/1679 |
| 2019/0254490 A1* | 8/2019 | Marutani | A47L 9/2847 |

* cited by examiner

ADAPTIVE REGION DIVISION METHOD AND SYSTEM

CROSS REFERENCES TO THE RELATED APPLICATIONS

This application is the national phase entry of International Application No. PCT/CN2018/106807, filed on Sep. 20, 2018, which is based upon and claims priority to Chinese Patent Application No. 201710883732.3, filed on Sep. 26, 2017, the entire contents of which are incorporated herein by reference.

TECHNICAL FIELD

This application relates to the field of computers, and in particular, to an adaptive region division method and system.

BACKGROUND

With the rapid development of the computer technology, microelectronics technology and network technology, robot technology has also developed rapidly. The level of industrial robots has been continuously improved, and various advanced robot systems used in the service industry have also made great progress. Various mobile service robots are becoming increasingly popularized, for example, mobile floor sweeping devices, shopping guide machines, automatic teller machines, and the like.

At present, the region division technology applied to smart mobile floor sweeping devices mainly divides the whole space into square regions with a fixed size, and then traverses each square region to cover the whole space. This method is simple and clear, but the generated partitions cannot exactly match an actual environment. For example, a wall may be easily classified into the same region, and thus two disconnected parts are in the same region. As a result, the cleaning efficiency is not high, and an obtained cleaning map is not beautiful enough.

SUMMARY

An objective of this application is to provide an adaptive region division method and system, to resolve the problem in the prior art that generated partitions cannot exactly match an actual environment.

According to one aspect of this application, an adaptive region division method is provided. The method includes:

building an environmental map based on laser radar data and odometer data, to determine information about an environment in which a target device is located;

performing feature extraction according to the laser radar data, to determine feature data, where the feature data includes line feature data and point feature data;

generating a virtual door according to the feature data and the information about the environment in which the target device is located; and dividing a to-be-divided region where the target device is located according to the virtual door.

Further, in the foregoing method, the determining information about an environment in which a target device is located includes:

planning a global path of the target device and determining location information about the environment in which the target device is located.

Further, in the foregoing method, the performing feature extraction according to the laser radar data, to determine feature data includes:

determining the line feature data by Hough line fitting according to the laser radar data; and determining the point feature data according to the line feature data and the laser radar data.

Further, in the foregoing method, the determining the point feature data according to the line feature data and the laser radar data includes:

if two line features are connected end to end, and a cross product of a first line direction and a second line direction is greater than 0, using data of an intersection point of the two line features as the point feature data; and if distances of three consecutive laser data points meet a preset mode, using a middle laser data point as the point feature data.

Further, in the foregoing method, the generating a virtual door according to the feature data and the information about the environment in which the target device is located includes:

determining a first line according to a line feature detected on a side of the target device;

determining a first point of the virtual door according to the first line and the point feature data; and generating the virtual door according to the first point of the virtual door and a second point determined by the first line and the first point of the virtual door, or generating the virtual door according to the first line and the line feature data.

Further, in the foregoing method, the determining a first point of the virtual door according to the first line and the point feature data includes:

searching, in a set of point feature data, whether there is such a target point whose distance to an end of the first line is within a preset distance threshold, and if yes, using the target point as the first point of the virtual door; or if not, using a current location of the target device in the environment as the first point of the virtual door.

Further, in the foregoing method, the generating the virtual door according to the first point of the virtual door and a second point determined by the first line and the first point of the virtual door includes:

determining whether there is at least one point feature falling in a first quadrant of a right-hand Descartes coordinate system with the first point of the virtual door as an origin and the first line as a positive direction of a coordinate axis;

if yes, selecting a point feature that is closest to the first point of the virtual door from the one or more point features falling in the first quadrant as the second point of the virtual door, and generating the virtual door according to the first point of the virtual door and the second point; or if not, determining whether at least one line feature corresponding to the line feature data intersects with an extension line of the first line, and if yes, using the extension line of the first line as the virtual door.

Further, in the foregoing method, after the dividing a to-be-divided region where the target device is located according to the virtual door, the method includes:

cleaning divided regions in a zigzag manner.

According to another aspect of this application, an adaptive region division system is further provided. The system includes:

a sensor module, a feature extraction module, a positioning and mapping module, a virtual door detection module, and a region coverage algorithm module, where the sensor module is configured to collect laser radar data and odometer data;

the positioning and mapping module is configured to obtain the laser radar data and the odometer data from the sensor module, and build an environmental map, to determine information about an environment in which a target device is located;

the feature extraction module is configured to obtain the laser radar data from the sensor module, and perform feature extraction to determine feature data, where the feature data includes line feature data and point feature data;

the virtual door detection module is configured to generate a virtual door according to the feature data generated in the feature extraction module and the information about the environment in which the target device is located; and the region coverage algorithm module is configured to divide a to-be-divided region where the target device is located according to the virtual door generated by the virtual door detection module.

Further, the positioning and mapping module is configured to:

plan a global path of the target device and determine location information about the environment in which the target device is located.

Further, the feature extraction module is configured to:

determine the line feature data by Hough line fitting according to the laser radar data; and determine the point feature data according to the line feature data and the laser radar data.

Further, the feature extraction module is configured to:

if two line features are connected end to end, and a cross product of a first line direction and a second line direction is greater than 0, use data of an intersection point of the two line features as the point feature data; and if distances of three consecutive laser data points meet a preset mode, use a middle laser data point as the point feature data.

Further, the virtual door detection module is configured to:

determine a first line according to a line feature detected on a side of the target device;

determine a first point of the virtual door according to the first line and the point feature data; and generate the virtual door according to the first point of the virtual door and a second point determined by the first line and the first point of the virtual door, or generate the virtual door according to the first line and the line feature data.

Further, the virtual door detection module is configured to:

search, in a set of point feature data, whether there is such a target point whose distance to an end of the first line is within a preset distance threshold, and if yes, use the target point as the first point of the virtual door; or if not, use a current location of the target device in the environment as the first point of the virtual door.

Further, the virtual door detection module is configured to:

determine whether there is at least one point feature falling in a first quadrant of a right-hand Descartes coordinate system with the first point of the virtual door as an origin and the first line as a positive direction of a coordinate axis;

if yes, select a point feature that is closest to the first point of the virtual door from the one or more point features falling in the first quadrant as the second point of the virtual door, and generate the virtual door according to the first point of the virtual door and the second point; or if not, determine whether at least one line feature corresponding to the line feature data intersects with an extension line of the first line, and if yes, use the extension line of the first line as the virtual door.

Further, the system includes:

a map storage module, configured to store the environmental map generated in the positioning and mapping module, where the environmental map is a grid map.

Further, the region coverage algorithm module is configured to:

clean divided regions in a zigzag manner.

According to another aspect of this application, a computer-readable medium is further provided. The computer-readable medium stores a computer-readable instruction, and the computer-readable instruction can be executed by a processor, to implement an adaptive region division method.

Compared with the prior art, this application provides an adaptive region division system. The system includes: a sensor module, a positioning and mapping module, a feature extraction module, a virtual door detection module, and a region coverage algorithm module. The sensor module is configured to collect laser radar data and odometer data, to provide a mobile device with information of an environment where the mobile device is located. The positioning and mapping module is configured to obtain the laser radar data and the odometer data from the sensor module, and build an environmental map, to determine information about an environment in which a target device is located. Positioning and mapping provide data basis of an intelligent mobile algorithm for the mobile device. The feature extraction module is configured to obtain the laser radar data from the sensor module, and perform feature extraction to determine feature data, where the feature data includes line feature data and point feature data, so that virtual door detection can be performed based on the extracted feature data. Then, the virtual door detection module is configured to generate a virtual door according to the feature data generated in the feature extraction module and the information about the environment in which the target device is located. Then, the region coverage algorithm module is configured to divide a to-be-divided region where the target device is located according to the virtual door generated by the virtual door detection module, so that the virtual door is generated according to the laser data of the current environment to achieve the purpose of adaptive region division. Therefore, generated partitions can match the actual environment, thus avoiding a case that two disconnected parts are in the same region because a wall or door is classified into the same region. The system may be applied to a mobile floor sweeping device, to generate a virtual door according to laser data of a current environment during the cleaning process, thereby achieving the purpose of adaptive region division, so that the mobile floor sweeping device can more efficiently and quickly cover the whole space.

BRIEF DESCRIPTION OF THE DRAWINGS

Other features, objectives, and advantages of this application will become more obvious by reading the detailed description of non-limiting embodiments provided with reference to the following accompanying drawings.

DETAILED DESCRIPTION OF THE EMBODIMENTS

The following further describes this application in detail with reference to the accompanying drawings.

In a typical configuration of this application, a terminal, a device of a service network, and a trusted party each include one or more processors (CPUs), an input/output interface, a network interface, and a memory.

The memory may include forms such as a volatile memory, a random access memory (RAM), and/or a non-volatile memory in computer readable media, for example, a read-only memory (ROM) or a flash memory (flash RAM). The memory is an example of the computer readable media.

The computer readable media include permanent and temporary, and removable and irremovable media, and information may be stored by using any method or technology. The information may be a computer readable instruction, a data structure, a program module, or other data. For example, computer storage media include, but are not limited to, a phase change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a cassette-type tape, a magnetic tape, a disk storage or other magnetic storage devices or any other non-transmission media, and can be used to store information accessible by a computing device. As defined herein, the computer readable media do not include non-transitory computer readable media (transitory media), for example, modulated data signals and carriers.

Figure 1:
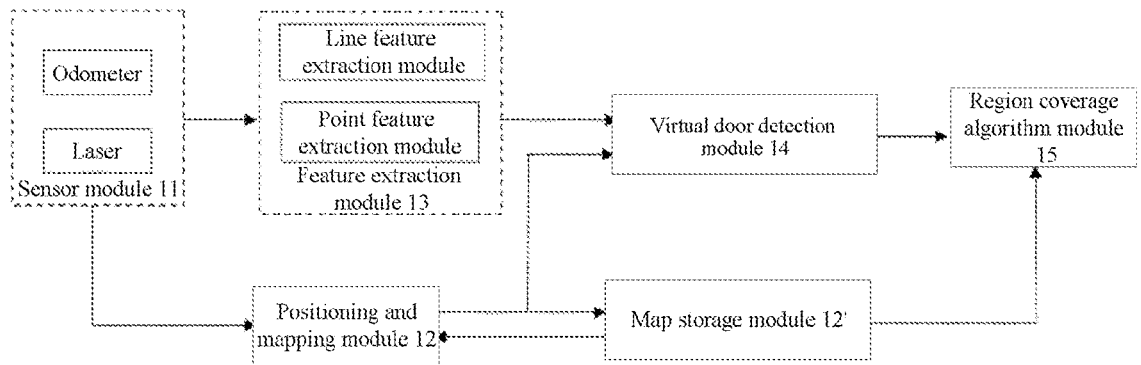
FIG. 1 is a schematic structural diagram of an adaptive region division system according to one aspect of this application.

FIG. 1 is a schematic structural diagram of an adaptive region division system according to one aspect of this application. The system includes: a sensor module 11, a positioning and mapping module 12, a feature extraction module 13, a virtual door detection module 14, and a region coverage algorithm module 15. The sensor module 11 is configured to collect laser radar data and odometer data, to provide a mobile device with information of an environment where the mobile device is located. The positioning and mapping module 12 is configured to obtain the laser radar data and the odometer data from the sensor module, and build an environmental map, to determine information about an environment in which a target device is located. Positioning and mapping provide data basis of an intelligent mobile algorithm for the mobile device. The feature extraction module 13 is configured to obtain the laser radar data from the sensor module, and perform feature extraction to determine feature data, where the feature data includes line feature data and point feature data, so that virtual door detection can be performed based on the extracted feature data. Then, the virtual door detection module 14 is configured to generate a virtual door according to the feature data generated in the feature extraction module and the information about the environment in which the target device is located, where the target device is a mobile device that currently needs to perform adaptive region division, and the virtual door is a virtual line and represents an object that partitions a region in an actual environment, for example, a wall, a door, and the like. Then, the region coverage algorithm module 15 is configured to divide a to-be-divided region where the target device is located according to the virtual door generated by the virtual door detection module. Therefore, the virtual door is generated according to the laser data of the current environment to achieve the purpose of adaptive region division.

Specifically, the sensor module 11 includes laser radar data and odometer data, to provide a mobile device with information of an environment where the mobile device is located, where the mobile device may be a smart mobile floor sweeping device, and the odometer data is distance data of a device, whose object position changes over time, relative to its initial position, where the odometer data is estimated by using data obtained from a mobile sensor.

The positioning and mapping module 12 mainly uses SLMA-related algorithm to build an environment map, which may be used for global path planning and a self-positioning module, to plan the global path of the target device and determine location information about the environment in which the target device is located. Further, the system includes: a map storage module 12', configured to store the environmental map generated in the positioning and mapping module, where the environmental map is a grid map. The grid map divides the environment into a series of grids, where a possible value is given to each grid to represent the probability that the grid is occupied. The map storage module 12' may further store a three-dimensional map and key frames in visual images.

The feature extraction module 13 includes a line feature extraction module and a point feature extraction module, and a line feature and a point feature are generated by the laser radar data in the sensor module 11 and output to the virtual door detection module 14.

The virtual door detection module 14 is configured to obtain a location of the mobile device in the environment from the positioning and mapping module 12 according to the line feature and the point feature generated by the feature extraction module 13, and generate a virtual door if a condition is met, to achieve the purpose of adaptive region division.

The region coverage algorithm module 15 gradually divides the region according to the virtual door generated by the virtual door detection module 14. Further, when the target device is a smart mobile floor sweeping device, the region coverage algorithm module 15 is configured to clean divided regions in a zigzag manner, so that the mobile floor sweeping device can more efficiently and quickly cover the whole space, thus improving the cleaning efficiency and obtaining a beautiful cleaning map.

In an embodiment of this application, the feature extraction module 12 is configured to: determine the line feature data by Hough line fitting according to the laser radar data; and determine the point feature data according to the line feature data and the laser radar data. In this case, the line feature data is obtained by Hough line fitting according to the laser radar data in the sensor module, and the point feature data is obtained according to the line feature data and the laser radar data. Obtaining the point feature includes two cases: if two line features are connected end to end, and a cross product of a first line direction and a second line direction is greater than 0, data of an intersection point of the two line features is used as the point feature data; and if distances of three consecutive laser data points meet a preset mode, a middle laser data point is used as the point feature data. In this case, two line features $\vec{L}_{ab}$ and $\vec{L}_{bc}$ are connected end to end, an intersection point is b, and $\vec{L}_{ab} \times \vec{L}_{bc} > 0$; therefore, b is a point feature. In addition, the point feature may also be obtained according to the laser radar data, and if distances of three consecutive laser data points meet a "far-near-far" mode, a middle data point is a point feature. After the line feature data and the point feature data are obtained through feature extraction, the virtual door detection module 14 is configured to: determine a first line according to a line feature detected on a side of the target device; determine a first point of the virtual door according to the first line and the point feature data; and generate the virtual door according to the first point of the virtual door and a second point determined by the first line and the first point of the virtual door, or generate the virtual door according to the first line and the line feature data. In this case, if a line feature is detected on the left side of the target device, the feature is denoted as First Line, and if no line feature is detected, it means that there is no obstacle blocking a region in an actual environment and the region is connected as a whole. After First Line is found, two points that can generate the virtual door are determined, and a line determined by connecting the two points is used as the virtual door. If two points that meet the condition are not found, it is checked whether First Line meets the condition, and an extension line of the first line is used as the virtual door.

Specifically, the virtual door is generated in the following manner:

searching, in a set of point feature data, whether there is such a target point whose distance to an end of the first line is within a preset distance threshold, and if yes, using the target point as the first point of the virtual door; or if not, using a current location of the target device in the environment as the first point of the virtual door; then, determining whether there is at least one point feature falling in a first quadrant of a right-hand Descartes coordinate system with the first point of the virtual door as an origin and the first line as a positive direction of a coordinate axis; if yes, selecting a point feature that is closest to the first point of the virtual door from the one or more point features falling in the first quadrant as the second point of the virtual door, and generating the virtual door according to the first point of the virtual door and the second point; or if not, determining whether at least one line feature corresponding to the line feature data intersects with an extension line of the first line, and if yes, using the extension line of the first line as the virtual door.

In an embodiment of this application, it is searched, in a set of point features, whether there is such a point feature that a distance whose distance to an end of the first line is within a preset distance threshold; if yes, the point feature is marked as First Point of the virtual door; if not, a current location of the target device in the environment is denoted as First Point. A set of point features falling in a first quadrant of a right-hand Descartes coordinate system with the first point as an origin and a first line direction as a positive direction of y-axis are recorded, and are marked as Second Point Candidates of the virtual door. If Second Point Candidates are empty, it indicates that there is no point in the first quadrant, then it is determined whether an extension line of First Line intersects with a line feature, and if yes, the extension line is used as the virtual door. If Second Point Candidates are not empty, a point closest to First Point is selected as Second Point, and then the virtual door is generated according to First Point and Second Point.

Therefore, by using the adaptive region division system in this application, generated partitions can match the actual environment, thus avoiding a case that two disconnected parts are in the same region because a wall or door is classified into the same region. The system may be applied to a mobile floor sweeping device, to generate a virtual door according to laser data of a current environment during the cleaning process, thus achieving the purpose of adaptive region division, so that the mobile floor sweeping device can more efficiently and quickly cover the whole space.

Figure 2:
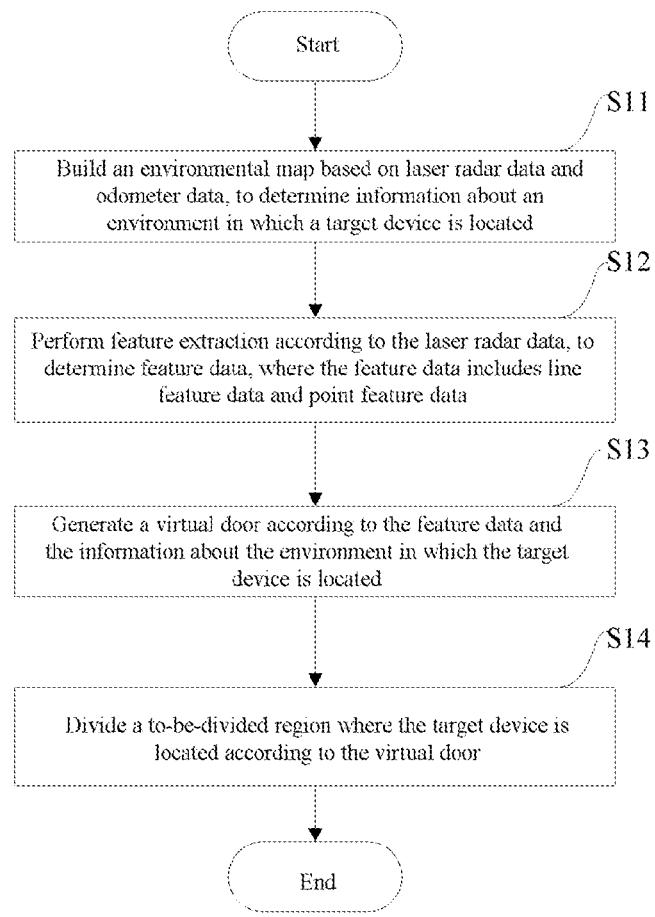
FIG. 2 is a schematic flowchart of an adaptive region division method according to another aspect of this application.

FIG. 2 shows a schematic flowchart of an adaptive region division method according to another aspect of this application. The method includes step S11 to step S14. In step S11, an environmental map is built based on laser radar data and odometer data, to determine information about an environment in which a target device is located, and provide data basis of an intelligent mobile algorithm for a mobile device. In step S12, feature extraction is performed according to the laser radar data, to determine feature data, where the feature data includes line feature data and point feature data, so that virtual door detection can be performed based on the extracted feature data. Then, in step S13, a virtual door is generated according to the feature data generated in the feature extraction module and the information about the environment in which the target device is located, where the target device is a mobile device that currently needs to perform adaptive region division, and the virtual door is a virtual line and represents an object that causes division of a region in an actual environment, for example, a wall, a door, and the like. Then, in step S14, a to-be-divided region where the target device is located is divided according to the virtual door generated by the virtual door detection module. Therefore, the virtual door is generated according to the laser data of the current environment to achieve the purpose of adaptive region division.

Specifically, in step S11, laser radar data and odometer data are obtained, to provide a mobile device with information about an environment where the mobile device is located, where the mobile device may be a smart mobile floor sweeping device, and the odometer data is distance data of a device, whose object position changes over time, relative to its initial position, where the odometer data is estimated by using data obtained from a mobile sensor.

In step S11, an environment map is built by mainly using an SLMA-related algorithm. The map may be used for global path planning and self-positioning, to plan a global path of the target device and determine location information about the environment in which the target device is located. Further, the environmental map generated in the positioning and mapping module is stored, where the environmental map is a grid map, and the grid map divides the environment into a series of grids. A possible value is given to each grid to represent the probability that the grid is occupied. A three-dimensional map and key frames in visual images may further be stored.

In step S12, two steps, i.e., line feature extraction and point feature extraction, are performed. A line feature and a point feature are generated by the obtained laser radar data, and virtual door detection is performed according to the generated line feature and point feature. In step S13, a location of the mobile device in the environment that is determined after positioning and mapping in step S11 is obtained according to the line feature and the point feature generated in step S12, and a virtual door is generated if a condition is met, to achieve the purpose of adaptive region division, where the condition to be met is a condition of generating a virtual door, that is, determining whether there is an obstacle such as a wall or a door in an actual environment according to the point feature, the line feature, and the location information of the mobile device, and if yes, a virtual door is generated, indicating that there is an obstacle in the actual environment and the region needs to be divided.

In step S14, the region is gradually divided by using the generated virtual door. Further, when the target device is a smart mobile floor sweeping device, divided regions are cleaned in a zigzag manner, so that the mobile floor sweeping device can more efficiently and quickly cover the whole space, thus improving the cleaning efficiency and obtaining a beautiful cleaning map.

In an embodiment of this application, in step S12, the line feature data is determined by Hough line fitting according to the laser radar data; and the point feature data is determined according to the line feature data and the laser radar data. In this case, the line feature data is obtained by Hough line fitting according to the laser radar data in the sensor module, and the point feature data is obtained according to the line feature data and the laser radar data. Obtaining the point feature includes two cases: if two line features are connected end to end, and a cross product of a first line direction and a second line direction is greater than 0, data of an intersection point of the two line features is used as the point feature data; and if distances of three consecutive laser data points meet a preset mode, a middle laser data point is used as the point feature data. In this case, two line features $\overline{L}_{ab}$ and $\overline{L}_{bc}$ are connected end to end, an intersection point is b, and $\overline{L}_{ab} \times \overline{L}_{bc} > 0$; therefore, b is a point feature. In addition, the point feature may also be obtained according to the laser radar data, and if distances of three consecutive laser data points meet a "far-near-far" mode, a middle data point is a point feature. After the line feature data and the point feature data are obtained through the feature extraction, a first line is determined according to a line feature detected on a side of the target device; a first point of the virtual door is determined according to the first line and the point feature data; and the virtual door is generated according to the first point of the virtual door and a second point determined by the first line and the first point of the virtual door, or the virtual door is generated according to the first line and the line feature data. In this case, if a line feature is detected on the left side of the target device, the feature is denoted as First Line, and if no line feature is detected, it indicates that there is no obstacle blocking a region in an actual environment and the region is connected as a whole. After First Line is found, two points that can generate the virtual door are determined, and a line determined by connecting the two points is used as the virtual door. If two points that meet the condition are not found, it is checked whether the first line meets the condition, and an extension line of First Line is used as the virtual door.

Specifically, the virtual door is generated in the following manner:

searching, in a set of point feature data, whether there is such a target point whose distance to an end of the first line is within a preset distance threshold, and if yes, using the target point as the first point of the virtual door; or if not, using a current location of the target device in the environment as the first point of the virtual door; then, determining whether there is at least one point feature falling in a first quadrant of a right-hand Descartes coordinate system with the first point of the virtual door as an origin and the first line as a positive direction of a coordinate axis; if yes, selecting a point feature that is closest to the first point of the virtual door from the one or more point features falling in the first quadrant as the second point of the virtual door, and generating the virtual door according to the first point of the virtual door and the second point; or if not, determining whether at least one line feature corresponding to the line feature data intersects with an extension line of the first line, and if yes, using the extension line of the first line as the virtual door.

In an embodiment of this application, it is searched, in a set of point features, whether there is such a point feature whose distance to an end of First Line is within a preset distance threshold, and if yes, the point feature is marked as First Point of the virtual door; or if not, a current location of the target device in the environment is marked First Point. A set of all point features falling in a first quadrant of a right-hand Descartes coordinate system with the first point as an origin and a first line direction as a positive direction of y-axis are recorded, and marked as Second Point Candidates of the virtual door. If Second Point Candidates are empty, it indicates that there is no point in the first quadrant, then it is determined whether an extension line of First Line intersects with a line feature, and if yes, the extension line is used as a virtual door. If Second Point Candidates are not empty, a point closest to First Point is selected as Second Point, and then a virtual door is generated according to First Point and Second Point.

Therefore, by using the adaptive region division method in this application, generated partitions can match an actual environment, thus avoiding a case that two disconnected parts are in the same region because a wall or door is classified into the same region. The method may be applied to a mobile floor sweeping device, to generate a virtual door according to laser data of a current environment during the cleaning process, thus achieving the purpose of adaptive region division, so that the mobile floor sweeping device can more efficiently and quickly cover the whole space.

According to another aspect of this application, a computer-readable medium is further provided. The computer-readable medium stores a computer-readable instruction, and the computer-readable instruction can be executed by a processor to implement an adaptive region division method. For example, the computer-readable instruction may be executed by the processor to:

build an environmental map based on laser radar data and odometer data, to determine information about an environment in which a target device is located;

perform feature extraction according to the laser radar data, to determine feature data, where the feature data includes line feature data and point feature data;

generate a virtual door according to the feature data and the information about the environment in which the target device is located; and divide a to-be-divided region where the target device is located according to the virtual door.

Apparently, a person skilled in the art can make various modifications and variations to this application without departing from the spirit and scope of this application. This application is intended to cover these modifications and variations provided that they fall within the protection scope defined by the claims of this application and equivalent technologies thereof.

It should be noted that, this application may be implemented in software and/or a combination of software and hardware, for example, may be implemented by using an application-specific integrated circuit (ASIC), a general purpose computer, or any other similar hardware device. In an embodiment, the software program in this application may be executed by a processor to implement the foregoing steps or functions. Similarly, a software program (including a related data structure) in this application may be stored in a computer-readable recording medium such as a RAM, a magnetic or optical drive, a floppy disk, or other similar devices. In addition, some steps or functions of this application may be implemented by using hardware, for example, a circuit that is used in combination with a processor to perform various steps or functions.

In addition, a part of this application may be applied to a computer program product, for example, a computer program instruction. When the computer program instruction is executed by a computer, the computer operates to invoke or provide the method and/or the technical solution according to this application. A program instruction for calling the method of this application may be stored in a fixed or removable recording medium, and/or transmitted through broadcast or via a data stream in other signal bearing media, and/or stored in a working memory of a computer device that runs according to the program instruction. Herein, an embodiment according to this application includes an apparatus. The apparatus includes a memory configured to store a computer program instruction and a processor configured to execute the program instruction. When the computer program instruction is executed by the processor, the apparatus is triggered to run the method and/or the technical solution according to multiple embodiments of this application.

It is apparent to a person skilled in the art that this application is not limited to details in the foregoing exemplary embodiments, and this application can be implemented in another specific form without departing from the spirit or basic features of this application. Therefore, the embodiments should be considered to be exemplary in all respects and not limitative. The scope of this application is not defined by the foregoing description but by the appended claims. Therefore, this application is intended to include all variations falling in the meaning and scope of the equivalents of the claims. No reference numerals in the claims should be considered as limitations to the related claims. In addition, the term "include" apparently does not exclude other units or steps, and a singular form does not exclude a plural form. Multiple units or apparatuses recited in an apparatus claim may also be implemented by one unit or apparatus through software or hardware. Terms such as "first" and "second" are used to indicate names, but do not indicate any particular sequence.

What is claimed is:

1. An adaptive region division method, comprising:
    collecting laser radar data and odometer data from a sensor module;
    building an environmental map based on the laser radar data and odometer data, to determine information about an environment in which a target device is located;
    performing feature extraction according to the laser radar data, to determine feature data, wherein the feature data comprises line feature data and point feature data;
    generating a virtual door according to the feature data and the information about the environment in which the target device is located; and
    dividing a to-be-divided region where the target device is located according to the virtual door;
    determining a first line according to a line feature detected on a side of the target device;
    determining a first point of the virtual door according to the first line and the point feature data;
    generating the virtual door according to the first point of the virtual door and a second point determined by the first line and the first point of the virtual door, or generating the virtual door according to the first line and the line feature data; and searching, in a set of point feature data, whether there is such a target point, wherein a distance of the target point to an end of the first line is within a preset distance threshold, and when yes, using the target point as the first point of the virtual door; and
    when not, using a current location of the target device in the environment as the first point of the virtual door.

2. The method according to claim 1, wherein determining information about the environment in which the target device is located comprises:
    determining location information about the environment in which the target device is located.

3. The method according to claim 1, wherein performing feature extraction according to the laser radar data, to determine the feature data comprises:
    determining the line feature data by Hough line fitting according to the laser radar data; and
    determining the point feature data according to the line feature data and the laser radar data.

4. The method according to claim 3, wherein determining the point feature data according to the line feature data and the laser radar data comprises:
    if two line features are connected end to end, and a cross product of a first line direction and a second line direction is greater than 0, using data of an intersection point of the two line features as the point feature data; and
    if distances of three consecutive laser data points meet a preset mode, using a middle laser data point as the point feature data.

5. The method according to claim 1, wherein generating the virtual door according to the first point of the virtual door and the second point determined by the first line and the first point of the virtual door comprises:
    determining whether there is at least one point feature falling in a first quadrant of a right-hand Descartes coordinate system with the first point of the virtual door as an origin and the first line as a positive direction of a coordinate axis;
    if yes, selecting a point feature that is closest to the first point of the virtual door from one or more point features falling in the first quadrant of the right-hand Descartes coordinate system as the second point of the virtual door, and generating the virtual door according to the first point of the virtual door and the second point; or
    if not, determining whether at least one line feature corresponding to the line feature data intersects with an extension line of the first line, and if yes, using the extension line of the first line as the virtual door.

6. The method according to claim 1, wherein after dividing the to-be-divided region where the target device is located according to the virtual door, the method comprises:
    cleaning a plurality of divided regions in a zigzag manner.

7. A computer-readable medium, storing a computer-readable instruction, the computer-readable instruction, when executed by a processor, implementing the method according to claim 1.

8. An adaptive region division system, comprising:
    a sensor module, a feature extraction module, a positioning and mapping module, a virtual door detection module, and a region coverage algorithm module, wherein
    the sensor module is configured to collect laser radar data and odometer data;
    the positioning and mapping module is configured to obtain the laser radar data and the odometer data from the sensor module, and build an environmental map, to determine information about an environment in which a target device is located;

the feature extraction module is configured to obtain the laser radar data from the sensor module, and perform feature extraction to determine feature data, wherein the feature data comprises line feature data and point feature data;

the virtual door detection module is configured to generate a virtual door according to the feature data generated in the feature extraction module and the information about the environment in which the target device is located; and the region coverage algorithm module is configured to divide a to-be-divided region where the target device is located according to the virtual door generated by the virtual door detection module;

wherein the virtual door detection module is configured to:

determine a first line according to a line feature detected on a side of the target device;

determine a first point of the virtual door according to the first line and the point feature data; and generate the virtual door according to the first point of the virtual door and a second point determined by the first line and the first point of the virtual door, or generate the virtual door according to the first line and the line feature data; and search, in a set of point feature data, whether there is such a target point, wherein a distance of the target point to an end of the first line is within a preset distance threshold, and if yes, use the target point as the first point of the virtual door; or if not, use a current location of the target device in the environment as the first point of the virtual door.

9. The system according to claim 8, wherein the positioning and mapping module is configured to:

determine location information about the environment in which the target device is located.

10. The system according to claim 8, wherein the feature extraction module is configured to:

determine the line feature data by Hough line fitting according to the laser radar data; and determine the point feature data according to the line feature data and the laser radar data.

11. The system according to claim 10, wherein the feature extraction module is configured to:

if two line features are connected end to end, and a cross product of a first line direction and a second line direction is greater than 0, use data of an intersection point of the two line features as the point feature data; and if distances of three consecutive laser data points meet a preset mode, use a middle laser data point as the point feature data.

12. The system according to claim 8, wherein the virtual door detection module is configured to:

determine whether there is at least one point feature falling in a first quadrant of a right-hand Descartes coordinate system with the first point of the virtual door as an origin and the first line as a positive direction of a coordinate axis;

if yes, select a point feature that is closest to the first point of the virtual door from one or more point features falling in the first quadrant of the right-hand Descartes coordinate system as the second point of the virtual door, and generate the virtual door according to the first point of the virtual door and the second point; or if not, determine whether at least one line feature corresponding to the line feature data intersects with an extension line of the first line, and if yes, use the extension line of the first line as the virtual door.

13. The system according to claim 8, comprising:

a map storage module, configured to store the environmental map generated in the positioning and mapping module, wherein the environmental map is a grid map.

14. The system according to claim 8, wherein the region coverage algorithm module is configured to:

clean a plurality of divided regions in a zigzag manner.

* * * * *